(12) United States Patent
Hallgren et al.

(10) Patent No.: US 11,467,019 B2
(45) Date of Patent: Oct. 11, 2022

(54) SENSOR FOR LEVEL AND TURBIDITY MEASUREMENT (71) Applicant: IVL Svenska Miljöinstitutet AB, Stockholm (SE)

(72) Inventors: Fredrik Hallgren, Mölndal (SE); Joel Wanemark, Gothenburg (SE)

(73) Assignee: IVL Svenska Miljöinstitutet AB, Stockholm (SE)

( * ) Notice: Subject to any disclaimer, the term of this patent is extended or adjusted under 35 U.S.C. 154(b) by 119 days.

(21) Appl. No.: 17/253,256

(22) PCT Filed: Jun. 18, 2019

(86) PCT No.: PCT/EP2019/066080
§ 371 (c)(1),
(2) Date: Dec. 17, 2020

(87) PCT Pub. No.: WO2020/002059
PCT Pub. Date: Jan. 2, 2020

(65) Prior Publication Data
US 2021/0278268 A1 Sep. 9, 2021

(30) Foreign Application Priority Data
Jun. 26, 2018 (SE) .................... 1850791-3

(51) Int. Cl.
*G01N 21/00* (2006.01)
*G01F 23/292* (2006.01)
(Continued)

(52) U.S. Cl.
CPC .......... *G01F 23/292* (2013.01); *G01N 21/53* (2013.01); *G01N 21/85* (2013.01); *G01N 2201/06113* (2013.01)

(58) Field of Classification Search
CPC ...... G01F 23/292; G01N 21/53; G01N 21/85; G01N 2201/06113; G01N 21/47;
(Continued)

(56) References Cited

U.S. PATENT DOCUMENTS 5,818,583 A 10/1998 Sevick-Muraca et al.

FOREIGN PATENT DOCUMENTS

| EP | 1241464 A1 | 9/2002 |
| GB | 984454 | 2/1965 |

(Continued)

OTHER PUBLICATIONS

International Search Report and Written Opinion, PCT Application No. PCT/EP2019/066080 (dated Oct. 24, 2019).
(Continued)

*Primary Examiner* — Md M Rahman
(74) *Attorney, Agent, or Firm* — Finch & Maloney, PLLC (57) ABSTRACT

The present invention relates to a monitoring system for measuring and communicating properties of a liquid, wherein said monitoring system is configured to be arranged in a mounted position above and at a distance from a surface of the liquid, and wherein said monitoring system comprises: a light source configured to emit light towards the surface of said liquid, such that at least a portion of said light is transmitted through said liquid; a light detector configured to detect light that has been emitted from said light source and transmitted through said liquid and to generate a representation of the intensity and spatial distribution of the emitted light that has been detected; a processing circuitry being configured to determine the turbidity of the liquid based on said representation.

20 Claims, 3 Drawing Sheets (51) Int. Cl.
*G01N 21/53* (2006.01)
*G01N 21/85* (2006.01)

(58) Field of Classification Search
CPC .... G01N 21/49; G01N 21/532; G01N 21/534; G01N 33/18
USPC .......................................................... 356/72
See application file for complete search history.

(56) References Cited

FOREIGN PATENT DOCUMENTS

| GB | 2355524 A | 4/2001 |
|---|---|---|
| GB | 2393783 A | 4/2004 |
| GB | 2407156 A | 4/2005 |
| WO | 2001/0163254 A1 | 8/2001 |
| WO | 2020002059 A1 | 1/2020 |

OTHER PUBLICATIONS

Written Opinion of the International Preliminary Examining Authority, PCT Application No. PCT/EP2019/066080 (dated May 11, 2020).

Notification of Transmittal of The International Preliminary Report on Patentabilty, PCT Application No. PCT/EP2019/066080 (dated Oct. 27, 2020).

Swedish Patent and Registration Office, Swedish Search Report, SE Patent Application No. 1850791-3 (dated Jan. 22, 2019).

SENSOR FOR LEVEL AND TURBIDITY MEASUREMENT

FIELD OF THE INVENTION

The present invention relates to a monitoring system and a method for measuring and communicating properties of a liquid.

BACKGROUND

In many applications, such as in monitoring a network of drainage pipes in a city or in a manufacturing process in a chemical industry, it is desirable to be able to measure the turbidity of a liquid. This may for example be of interest when determining the severity of potential overflows in the network of drainage pipes, as a fault detection mechanism in process steps where no turbidity is to be expected, or as a measure of the status of a processing liquid in an industrial process such as clearing or sedimentation, or for similar reasons. Currently available solutions for measuring turbidity include the measurement of attenuation of light as it passes through a sample column of liquid. Such measurements are often done by placing a photodetector in a body of liquid and illuminating said body of liquid with a light source having a predetermined strength. Thus, the amount of light detected by the photodiode may be used to calculate the turbidity of the liquid.

The abovementioned solution has several drawbacks, among which are the fact that varying levels of a liquid may result in different calculated levels of turbidity, and that the submersion of a light source into the liquid may be such that the process undergone by the liquid is disturbed or interfered with. Furthermore, submersion of a light source makes it difficult for a user to perform maintenance on the currently available monitoring systems.

Also, measurements of turbidity may be made in a lab, wherein a sample is extracted from the liquid body that is to be measured, upon which said sample is analyzed. This is a time consuming and labor-intensive method of analyzing the turbidity of a liquid.

SUMMARY OF THE INVENTION

An object of the present invention is therefore to alleviate the abovementioned problems and provide a monitoring system for measuring and communicating properties of a liquid.

The above and other objects which will be evident from the following description are achieved by a monitoring system and a method according to the present invention.

According to a first aspect of the present invention, a monitoring system for measuring and communicating properties of a liquid is provided, wherein said monitoring system is configured to be arranged in a mounted position above and at a distance from a surface of the liquid, and wherein said monitoring system comprises: a light source configured to emit light towards the surface of said liquid, such that at least a portion of said light is transmitted through said liquid; a light detector configured to detect light that has been emitted from said light source and transmitted through said liquid and to generate a representation of the intensity and spatial distribution of the emitted light that has been detected; a processing circuitry being configured to determine the turbidity of the liquid based on said representation.

Turbidity is to be understood as being the cloudiness or haziness of a fluid caused by e.g. large numbers of individual particles that are generally invisible to the naked eye. Measuring turbidity is important in determining water quality and an improved system and method for doing so thus provides a better and more efficient way of determining water quality.

In the following, any reference to the liquid is to be understood as also referring to particles which may be suspended therein.

A monitoring system according to the present invention is beneficial for a number of reasons, among which that it allows for better usability. This is due to the fact that the system does not require being set up at a specific distance to the surface of the liquid in order to be able to measure properties thereof, thus making it easier to install. After mounting the monitoring system at a distance from the surface of the liquid, the system may be calibrated to account for the expected distance between the light detector and/or the light source and the surface of the liquid.

Another benefit of the present invention is that no part of the monitoring system has to be in contact with the liquid in order to determine properties thereof, thus making it less prone to contamination and thereby reducing the need for maintenance. This is beneficial both from an economic perspective and from a reliability perspective.

The monitoring system according to the present invention may for example be used for detecting and measuring properties in a number of different applications. The monitoring system may for example be used in a storm drain for monitoring turbidity and/or water levels therein. This may be done to detect and record the frequency of overflowing storm drains and to assess the severity thereof. Additionally or alternatively, the monitoring system of the present invention may be used in processing industry applications in order to measure properties of a liquid processed therein. In such cases, the monitoring system may form part of a controlling system arranged to control a process, e.g. a treatment process, manufacturing process or production process, based on measured properties and parameters of the liquid.

According to one exemplary embodiment, the processing circuitry is arranged in communication with said light detector. Said communication may for example be either wired or wireless communication.

According to one exemplary embodiment, the processing circuitry is configured to communicate with an external device. Said external device may be configured to log measurements of level and/or turbidity of a liquid. Said external device may also be configured to communicate with a plurality of processing circuitries of a plurality of monitoring systems according to the present invention. Thus, a network of monitoring systems is provided for measuring and communicating properties of a liquid at a plurality of measurement points. This allows a user of the system to analyze a larger portion of the liquid than is possible with only one monitoring system.

According to one exemplary embodiment, said monitoring system comprises a housing, wherein said light source, said light detector and said processing circuitry are all arranged in said housing.

Thus, a user may mount the monitoring system in its intended place of use more easily. Furthermore, the housing allows the components of the monitoring system to be protected from unintentional contact with the liquid that is to be measured, thereby reducing the risk of equipment failure.

According to one exemplary embodiment, the light detector is configured to detect light that has been reflected by the liquid. This is to be understood as meaning that the light detector is configured to detect both specular and diffuse reflections, i.e. light reflected off the surface of the liquid, and light reflected off particles suspended in the liquid, i.e. light transmitted through the liquid and reflected by particles suspended therein.

According to one exemplary embodiment, said representation is a digital representation. A digital representation could for example be an array of values, with each entry comprising at least values representing the intensity and spatial distribution of the light transmitted through the liquid.

According to at least one exemplary embodiment, said representation is a numerical representation.

The representation being numerical allows for a quick and efficient analysis and determination of the level and turbidity of the liquid, without the need for using more processor heavy image analysis algorithms.

According to at least one exemplary embodiment, said representation is an image representation.

The representation being an image representation allows for a secure and reliable determination of the level and turbidity of the liquid, as the large amount of data present in an image representation allows for the use of complex image analysis algorithms. Furthermore, the large amount of data present in an image representation allows for the use of self-learning image recognition algorithms.

According to one exemplary embodiment, said processing circuitry is configured to determine the level and turbidity of the liquid based on said representation.

In the present invention, the level of the liquid, i.e. the amount of liquid present in a given volume, is measured by determining the distance between the monitoring system and the surface of the liquid. This distance may then be related to a predetermined maximum level value. This maximum value may be calibrated upon installation of the monitoring system and may correspond to the distance between the monitoring system and the surface of the liquid being zero or close to zero. The distance determined may also or alternatively be related to a predetermined minimum level value of the liquid (e.g. no liquid present) which corresponds to the distance between the surface of the liquid and the monitoring system being at a predetermined maximum. This minimum level value or maximum distance between the monitoring system and the surface of the liquid may be calibrated upon installation of the monitoring system.

According to one exemplary embodiment, said processing circuitry is configured to determine the level of the liquid based on said representation.

According to one exemplary embodiment, said light detector and said light source are arranged such that an optical axis of said light detector is angled relative to an optical axis of said light source.

According to one exemplary embodiment, an optical axis of said light detector and an optical axis of said light source are arranged at an angle relative to each other.

According to one exemplary embodiment, the respective optical axes of the light detector and the light source are not parallel with each other. This improves the accuracy of the measurement of properties of the liquid, as the light detector may more accurately detect the intensity and spatial distribution of the light emitted from the light source.

An optical axis is to be understood as being a line along which there is some degree of rotational symmetry in an optical system or component, for example a light detector or a light source.

In one exemplary embodiment, when the monitoring system is in use for measuring and communicating properties of a liquid, the light emitted from said light source is transmitted through the liquid at an angle of refraction that is smaller than the angle of incidence.

In one exemplary embodiment, an optical axis of said light detector is arranged at an angle relative to the angle of refraction of the light emitted from said light source and transmitted through said liquid.

This is to avoid the light detector being arranged in parallel with the optical axis of the portion of the light emitted from the light source that is transmitted through the liquid. Arranging the light detector at an angle relative to this refracted light optical axis allows for a more accurate detection of the intensity and spatial distribution of the light emitted from the light source.

The optical axis of the light source may alternatively be referred to as the optical axis of the light emitted from the light source, or as the emitted light optical axis. The optical axis of the portion of the light emitted from the light source that is transmitted through the liquid may be referred to as the refracted light optical axis.

According to one exemplary embodiment, when the monitoring system is in use for measuring and communicating properties of a liquid, said light detector is arranged at a distance from said light source in a geometrical plane that is parallel with the surface of the liquid.

By arranging the light source and the light detector at a distance from each other, better discernibility of the spatial distribution of the emitted light that has been detected is achieved.

According to one exemplary embodiment, said light detector and said light source are arranged such that an optical axis of said light detector is parallel with an optical axis of said light source.

According to one exemplary embodiment, said angle between the optical axis of said light detector and the optical axis of said light source is greater than 2°, preferably greater than 4°, more preferably greater than 6°, more preferably greater than 8°, more preferably greater than 10°, more preferably greater than 12°, more preferably greater than 14°, more preferably greater than 16°, or most preferably greater than 18°.

According to one exemplary embodiment, said angle between the optical axis of said light detector and the optical axis of said light source is smaller than 40°, preferably smaller than 36°, more preferably smaller than 32°, more preferably smaller than 28°, more preferably smaller than 26°, more preferably smaller than 24°, more preferably smaller than 22°, more preferably smaller than 20°, more preferably smaller than 18°, more preferably smaller than 16°, more preferably smaller than 14°, more preferably smaller than 12°, more preferably smaller than 10°, more preferably smaller than 8°, or most preferably smaller than 6°.

According to one exemplary embodiment, said light source is configured to emit light towards the surface of said liquid at an angle of incidence that is greater than 2°, preferably greater than 4°, more preferably greater than 6°, more preferably greater than 8°, more preferably greater than 10°, more preferably greater than 12°, more preferably greater than 14°, more preferably greater than 16°, or most preferably greater than 18°.

According to one exemplary embodiment, said light source is configured to emit light towards the surface of said liquid at an angle of incidence that is smaller than 40°, preferably smaller than 36°, more preferably smaller than 32°, more preferably smaller than 28°, more preferably smaller than 26°, more preferably smaller than 24°, more preferably smaller than 22°, more preferably smaller than 20°, more preferably smaller than 18°, more preferably smaller than 16°, more preferably smaller than 14°, more preferably smaller than 12°, more preferably smaller than 10°, more preferably smaller than 8°, or most preferably smaller than 6°.

By having the angle between the optical axis of the light detector and the optical axis of the light source angled towards each other by 2° to 40°, such as by 2° to 10°, or by having said light source configured to emit light towards the surface of said liquid at an angle of incidence that is between 2° and 40°, such as 2° to 10°, an accurate measurement of the level and turbidity of the liquid is possible. If the angle is smaller than 2° and the light source and the detector are arranged close to each other, the light detector may not be able to accurately detect any meaningful differences in the position where the emitted light intersects the surface of the liquid that is to be measured, thus not being able to detect varying liquid levels.

According to one exemplary embodiment, the light detector is configured to detect a position where the emitted light intersects the surface of the liquid, wherein said position is to be understood as being a position in a geometric plane that is parallel with the surface of the liquid.

When the monitoring system is in use for measuring and communicating the level and turbidity of a liquid, the light emitted from said light source is transmitted through the liquid at an angle of refraction that is greater than 2°, preferably greater than 4°, more preferably greater than 6°, more preferably greater than 8°, more preferably greater than 10°, more preferably greater than 12°, more preferably greater than 14°, more preferably greater than 16°, or most preferably greater than 18°

When the monitoring system is in use for measuring and communicating the level and turbidity of a liquid, the light emitted from said light source is transmitted through the liquid at an angle of refraction that is smaller than 40°, preferably smaller than 36°, more preferably smaller than 32°, more preferably smaller than 28°, more preferably smaller than 26°, more preferably smaller than 24°, more preferably smaller than 22°, more preferably smaller than 20°, more preferably smaller than 18°, more preferably smaller than 16°, more preferably smaller than 14°, more preferably smaller than 12°, more preferably smaller than 10°, more preferably smaller than 8°, or most preferably smaller than 6°.

According to one exemplary embodiment, said representation comprises information related to the rate of diffusion of the portion of said emitted light that is transmitted through said liquid.

A low rate of diffusion corresponds to a low turbidity, as this means that there are fewer particles suspended in the liquid which may reflect the light transmitted therethrough. A higher rate of diffusion corresponds to higher turbidity, as this means that there are more particles suspended in the liquid which may reflect the light transmitted therethrough. The rate of diffusion is related to the spatial distribution of the emitted light that has been detected.

According to one exemplary embodiment, the processing circuitry is configured to determine the rate of diffusion of the portion of said emitted light that is transmitted through said liquid based on said representation.

According to one exemplary embodiment, information about the rate of diffusion of the portion of said emitted light that is transmitted through said liquid is inferable from said representation.

According to one exemplary embodiment, the processing circuitry is configured to determine the average size of the particles suspended in the liquid based on the representation. Different average sizes of particles generate different spatial distributions and intensities of the light detected, thus generating different representations. For example, larger particles cause proportionately less diffusion in relation to the intensity falloff of the light than smaller particles do. Additionally or alternatively, the average size of the particles may be determined by analyzing the spatial distribution of the light scattered from the point where the light intersects the surface of the liquid. Less scattering at the surface of the liquid is indicative of larger average size of the particles suspended therein.

According to one exemplary embodiment, the processing circuitry is configured to determine the turbidity of the liquid as a function of the depth of the liquid. Thus, different turbidity levels at different depth levels of the liquid may be determined. In storm drain application, this allows the system to differentiate between different types of overflows. For example, an overflow having low turbidity in the uppermost portion of the overflowing liquid (potentially combined with a high turbidity in the lowermost portion of the overflowing liquid) may require a different response than an overflowing liquid having high turbidity all the way through. In process industry applications, this allows the system to, for example, measure sedimentation and the rate of sedimentation of particles suspended in the liquid. This information may then be used to control the process to which the liquid is subjected.

According to one exemplary embodiment, said representation comprises information about a position where said emitted light intersects the surface of the liquid.

According to one exemplary embodiment, said light detector is configured to detect the position where light that has been emitted from said light source intersects the surface of said liquid and to generate a representation of the intensity and spatial distribution of the emitted light that has been detected, wherein said representation comprises information about the position where said emitted light intersects the surface of the liquid.

Thus, said representation may be used to correlate the position at which the emitted light intersects the surface of the liquid with predetermined values or positions of intersection for different levels of the liquid.

According to one exemplary embodiment, said processing circuitry is configured to relate the intensity and/or the spatial distribution of the emitted light that has been detected to a reference path of transmission through the liquid. Thereby, the turbidity and/or level of the liquid may be determined by comparing the reference path with the detected intensity and/or spatial distribution of the emitted light. The reference path may for example be a straight line extending with no diffusion from the light source to the bottom of the volume in which the liquid that is to be measured is held. The reference path may form part of a 3D representation or a 2D representation with which the detected intensity and spatial distribution of the emitted light is compared in order to determine the turbidity and/or level of the liquid.

According to one exemplary embodiment, said light source is configured to emit a focused light beam.

By using a focused light beam, better discernibility of the spatial distribution of the light transmitted through the liquid may be achieved. This allows for a more reliable determination of the turbidity and the level of the liquid.

According to one exemplary embodiment, said light source comprises a focusing element.

By having a focusing element, such as a lens, a mirror or similar optical configuration, a focused light beam may be achieved using an omnidirectional light source. As omnidirectional light sources, e.g. LEDs or light bulbs, may be provided cheaper than unidirectional light sources, e.g. lasers, a cheaper monitoring system may be achieved by using a focusing element to provide a focused light beam.

According to one exemplary embodiment, said light source is a laser.

Using a laser provides for improved accuracy and reliability of the monitoring system. Due to the inherent properties of a laser, a monitoring system using a laser may be used to provide a more precise determination of turbidity and liquid level than with other light sources.

According to one exemplary embodiment, said representation is a 2-dimensional digital image representation.

Said 2-dimensional digital image representation defines a x-direction, and a y-direction perpendicular to said x-direction. The x-direction and the y-direction collectively define an image plane.

Said 2-dimensional digital image representation may comprise a number of pixels, wherein each pixel has a position, color and light intensity that corresponds to the intensity and spatial distribution of the detected light.

According to one exemplary embodiment, said processing circuitry is configured to determine the level and turbidity of the liquid by means of image recognition.

Using commonly available image recognition algorithms allows the system to utilize feedback from the execution of the detection, and from user input. Thus, a monitoring system that has been trained or is self-learning may be provided. Such a system has better accuracy and reliability than a traditional gray value sensor used in turbidity measurements.

According to a second aspect of the present invention, a method for determining properties of a liquid is provided, said method comprising:

emitting light towards a surface of the liquid, detecting a portion of the light that has been emitted towards the surface of the liquid, after said portion of the light has intersected the surface of the liquid, generating a representation of the intensity and spatial distribution of the emitted light that has been detected analyzing said representation to determine the turbidity of the liquid.

According to one exemplary embodiment, light is emitted towards the surface of the liquid at an angle of incidence relative to the surface of the liquid, said method further comprising:

providing a detector and arranging said detector above the surface of the liquid such that an optical axis of the detector is at an angle relative to the angle of incidence.

According to one exemplary embodiment, said method further comprises providing a light source and arranging said light source above the surface of the liquid.

According to one exemplary embodiment, said representation is a digital image representation, and wherein said digital image representation is analyzed by means of an image recognition algorithm.

The method according to the second aspect of the present invention may be used with a monitoring system according to the different embodiments of the first aspect of the present invention. The advantages described above for any of these features are also valid for the second aspect of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, with reference to the appended drawing, wherein.

DETAILED DESCRIPTION OF THE DRAWINGS

In the present detailed description, embodiments of a monitoring system according to the present invention are mainly discussed with reference to drawings showing a monitoring system in use for measuring and communicating properties of water in a storm drain, as well as portions being relevant in relation to various embodiments of the invention. It should be noted that this by no means limits the scope of the invention, which is also applicable in other circumstances for instance with other types or variants of monitoring systems than the embodiments shown in the appended drawings, such as a monitoring system for measuring and communicating properties of a liquid in a step of a manufacturing process, treatment process or production process. Further, that specific features are mentioned in connection to an embodiment of the invention does not mean that those components cannot be used to an advantage together with other embodiments of the invention.

The invention will now by way of example be described in more detail by means of embodiments and with reference to the accompanying drawings.

Figure 1:
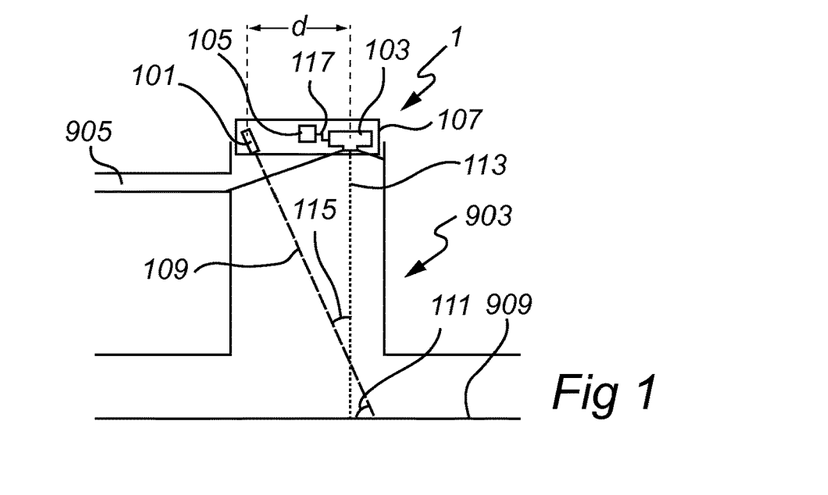
FIG. 1 is a schematic view of a monitoring system according to one exemplary embodiment of the present invention.

FIG. 1 is a schematic view of a monitoring system 1 according to one exemplary embodiment of the present invention. The monitoring system 1 shown in FIG. 1 is in use for measuring and communicating levels and turbidity of water 901 in a storm water drain 903, and comprises a light source 101 and a detector 103, both of which are arranged in a housing 107 configured to protect them from contamination by the water that is to be measured. The housing 107, with the light source 101 and the detector 103 arranged therein, is mounted near the top of the storm water drain 903, above the surface of the water 901 held therein. The storm water drain 903 comprises a runoff pipe 905 for preventing storm water 901 from exiting the storm water drain 903 through the upper opening thereof. Thus, the monitoring system 1 shown in FIG. 1 may be used to detect, track and record the number and frequency of overflows through the runoff pipe 905.

The light source 101 shown in FIG. 1 is configured to emit a focused light beam 109, illustrated by the dashed line extending therefrom. The light source 101 is mounted onto the housing 107 at an angle 111 relative to a horizontal plane, such that the light beam 109 emitted therefrom intersects the surface of the water 901 at an angle of incidence. Other angles of incidence than that which is illustrated are also conceivable, as is described in relation to the various embodiments of the present invention. After intersecting the surface of the water 901, the light beam 109 continues downward through the water 901, continually diffusing due to particles 907 suspended in the water 901, until it intersects the bottom 909 of the storm water drain 903.

The detector 103 shown in FIG. 1 is mounted onto the housing 107 facing downwards, at a perpendicular angle relative to the horizontal plane. The detector 103 has a field of view such that the entire width of the storm water drain 903 is in view, thus allowing for the detection of the light beam 109 intersecting the surface of the water 901 at various water levels. The detector 103 shown in FIG. 1 is a camera arranged to record light emitted from the light source 101 and reflected by the water surface 901' and particles 907 suspended in the water 901, and to generate an image 501 based on this recorded light.

The detector 103 and the light source 101 are mounted onto the housing 107 at a distance d from each other, so as to further improve the discernibility of the path along which the light beam 109 is transmitted through the water 901. By increasing the distance d between the light source 101 and the detector 103, the detector 103 may more easily detect light that has been emitted from the light source 101 and transmitted through the liquid 901 so that a digital image representation 501 of the intensity and spatial distribution of the emitted light that has been detected may be generated.

The optical axes of the light source 101 and the detector 103, illustrated in FIG. 1 by the dashed 109 and the dotted line 113, respectively, are arranged at an angle 115 relative to each other. This allows the detector 103 to see the path along which the focused light beam 109 is transmitted through the water 901. This allows the detection of different water levels and the turbidity at each level. This will be further explained in relation to FIG. 4*a-d*.

The monitoring system 1 of FIG. 1 further comprises processing circuitry 105 configured to determine the level and turbidity of the water 901 in the storm water drain 903 based on the image 501 generated by the detector 103. The processing circuitry 105 is arranged in communication with the detector 103. In FIG. 1, this is illustrated as a wired connection 117. However, wireless connections are also conceivable, as is described in relation to the various embodiments of the present invention.

Figure 2:
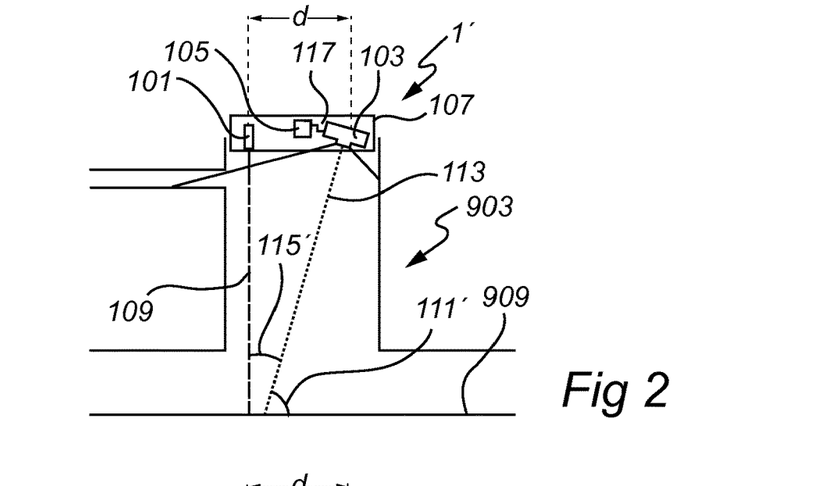
FIG. 2 is a schematic view of a monitoring system according to one exemplary embodiment of the present invention.

FIG. 2 is a schematic view of a monitoring system 1' according to one exemplary embodiment of the present invention. Unlike the monitoring system 1 of FIG. 1, the monitoring system 1' shown in FIG. 2 comprises a detector 103 that is mounted onto the housing 107 at an angle 111' relative to a horizontal plane, such that the optical axis 113 thereof may intersect the surface of the water at an angle of incidence when the system 1' is in use. Other angles of incidence than that which is illustrated are also conceivable, as is described in relation to the various embodiments of the present invention. Furthermore, the light source 101 shown in FIG. 2 is mounted onto the housing 107 facing downwards, at a perpendicular angle relative to the surface 901' of the water. In other words, instead of having a vertically aligned detector 103 and an angled light source 101, the monitoring system 1' of FIG. 2 has a vertically aligned light source 101 and an angled detector 103. Thus, substantially the same monitoring effect is achieved with a different configuration of the constituent parts of the monitoring system 1'.

Figure 3:
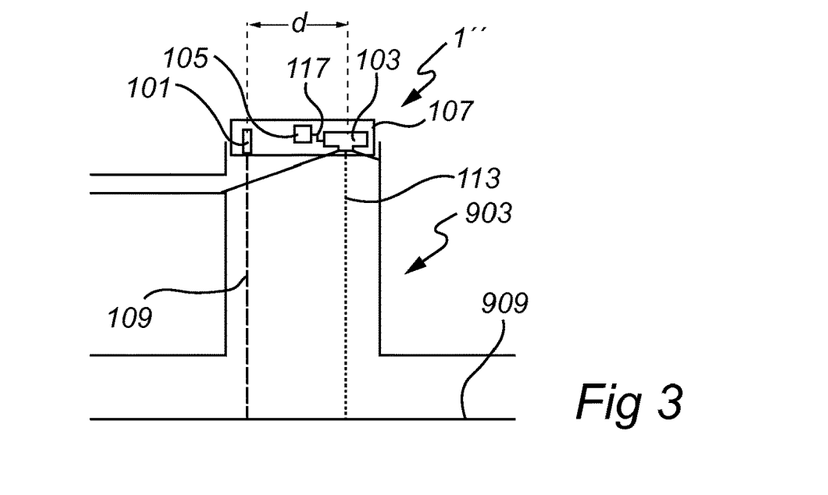
FIG. 3 is a schematic view of a monitoring system according to one exemplary embodiment of the present invention.

FIG. 3 is a schematic view of a monitoring system 1" according to one exemplary embodiment of the present invention. Unlike the monitoring systems 1, 1' of FIG. 1-2, the monitoring system 1" shown in FIG. 2 comprises a detector 103 and a light source 101 that are mounted onto the housing 107 such that both are facing downwards, at a perpendicular angle relative to the surface of the water 901'. Like the previous embodiments shown in FIGS. 1-2, the detector 103 and the light source 101 are arranged at a distance from each other such that there is an angle between a peripheral portion of the field of view of the detector 103 and the optical axis 109 of the light source 101. Thus, the light detector 103 may detect differences in the position where the emitted light 109 intersects the surface 901' of the liquid that is to be measured, thus being able to detect varying liquid levels, even though the detector 103 and the light source 101 that are mounted onto the housing 107 such that both are facing downwards.

FIGS. 4*a-d* are schematic views of the monitoring system 1 of FIG. 1 illustrating the method for determining properties of a liquid. The level of the liquid 901, i.e. the amount of liquid 901 present in a given volume, is measured by determining the distance between the monitoring system 1 and the surface 901' of the liquid 901. This distance is then related to a predetermined maximum level value. This maximum value is calibrated upon installation of the monitoring system 1 and corresponds to the distance between the monitoring system 1 and the surface 901' of the liquid 901 being zero or close to zero.

As has been described in relation to FIG. 1, the monitoring system 1 is in use for measuring and communicating levels and turbidity of water 901 in a storm water drain 903, and comprises a light source 101 and a detector 103, both of which are arranged in a housing 107 configured to protect them from contamination by the water 901 that is to be measured. The light source 101 is arranged to emit light 109 at an angle of incidence towards the surface 901' of the water 901, at which the focused light beam 109 intersects the surface 901' and is refracted such that it continues through the liquid 901 at an angle of refraction. The detector 103 is arranged directly above the surface 901' of the water 901 and an optical axis 113 thereof is arranged at an angle to both the angle of incidence and the angle of refraction.

Figure 4A:
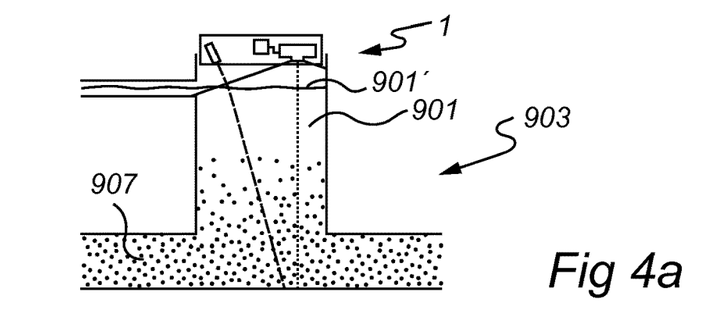
FIGS. 4a-d are schematic views of the monitoring system of FIG. 1 illustrating the method for determining properties of a liquid.

FIG. 4*a* shows the monitoring system 1 of FIG. 1, when in use for measuring the level and turbidity of water 901 in a storm water drain 903. The water level in the storm water drain 903 in FIG. 4*a* is at a level such that it overflows through the runoff pipe 905 connected to the storm water drain 903. The water 901 closest to the surface 901' comprises few or no suspended particles 907, while the water 901 closest to the bottom 909 of the storm water drain 903 comprises a higher concentration of particles 907. The focused light beam 109 emitted from the light source 101 intersects the surface 901' of the water 901, is refracted thereby, and thereafter transmitted through the water 901 towards the bottom 909 of the storm water drain 903. The detector 103 detects a portion of the light 109 that has been emitted towards the surface 901' of the liquid 901, after this portion of the light 109 has intersected the surface 901' of the liquid 901 and generates a digital image representation 501 based on the light 109 thus detected.

Figure 5A:
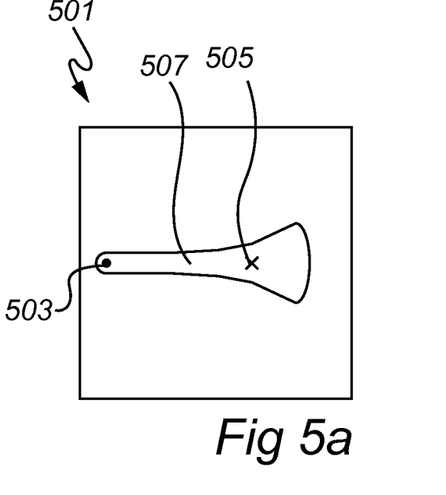
FIGS. 5a-d are schematic views of the representation generated by the monitoring system of FIG. 1 whilst performing the method of FIGS. 4a-d.

FIG. 5*a* shows a schematic view of the digital image representation 501 generated by the monitoring system 1 of FIG. 1 whilst performing the method described in relation to FIG. 4*a*. The digital image representation 501 comprises a point 503 corresponding to a position at which the focused light beam 109 intersects the surface of the water, and a point 505 corresponding to the optical axis 113 of the detector 103. The digital image representation 501 further comprises a line 507 representing the path along which the focused light beam is transmitted through the liquid 901.

Positions closer to the left-hand side of the image 501 correspond to positions closer to the surface 901' of the water 901, while positions closer to the right-hand side correspond to positions closer to the bottom 909 of the storm water drain 903. As the density of suspended particles 907 increases in a downward direction, the line 507 broadens. This is due to the light emitted being dispersed by the particles 907 suspended in the liquid 901. Thereby information related to the rate of diffusion of the light that is transmitted through the liquid 901 may be inferred through the digital image representation 501. A low rate of diffusion, such as is seen in the left-hand portion of the image 501, corresponds to a low turbidity, such as in the upper portions of the water 901 held in the storm water drain 903.

The processing circuitry 105 analyzes the representation 501 generated by the detector 103 in order to determine the turbidity and level of the liquid 901. The location of the point 503 corresponding to the position at which the focused light beam intersects the surface 901' of the water 901 is used to determine the level of the water 901, while the spatial distribution of the line 507 extending therefrom, corresponding to the path of the light beam 109 as it is transmitted through the water 901, is used to determine the turbidity of the water 901. This analysis is done by means of image recognition software and algorithms, comparing the digital image representation 501 generated to a database of known cases for different levels and turbidities of a liquid.

Figure 4B:
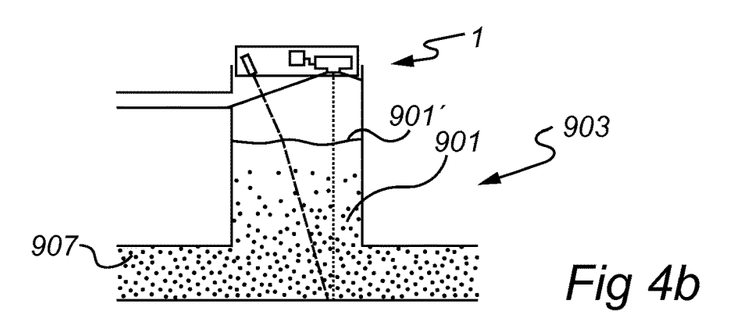

FIG. 4b shows the monitoring system of FIG. 1, when in use for measuring the level and turbidity of water 901 in a storm water drain 903. The water level in the storm water drain 903 in FIG. 4b is at a level below that of FIG. 4a, such that it does not overflow through the runoff pipe 905 connected to the storm water drain 903. Like the situation illustrated in FIG. 4a, the water 901 closest to the surface 901' comprises few or no suspended particles 907, while the water 901 closest to the bottom 909 of the storm water drain 903 comprises a higher concentration of particles 907.

Figure 5B:
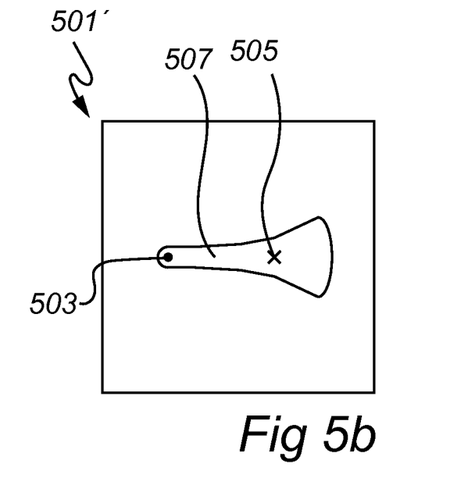

FIG. 5b shows a schematic view of the digital image representation 501' generated by the monitoring system 1 of FIG. 1 whilst performing the method described in relation to FIG. 4b. The digital image representation 501' comprises a point 503 corresponding to a position at which the focused light beam 109 intersects the surface 901' of the water 901. In FIG. 5b, this point 503 is located further towards the right-hand side than the same point 503 in FIG. 5a. This corresponds to the water level being lower in FIG. 4b than in FIG. 4a. Furthermore, the line 507 representing the path along which the focused light beam 109 is transmitted through the liquid 901 has a shorter portion corresponding to a low turbidity than the line shown in FIG. 5a.

Figure 4C:
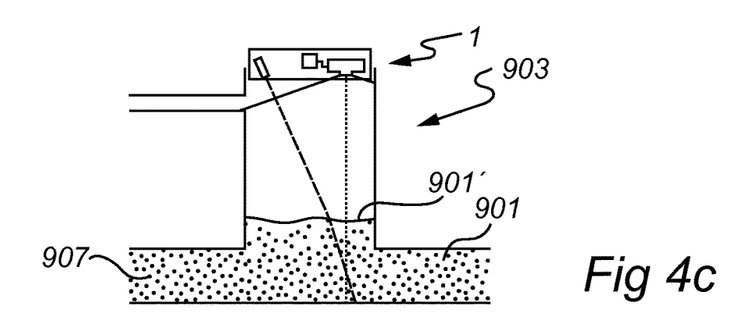

FIG. 4c shows the monitoring system 1 of FIG. 1, when in use for measuring the level and turbidity of water 901 in a storm water drain 903. The water level in the storm water drain 903 in FIG. 4c is at a level below that of FIG. 4b. Unlike the situation illustrated in FIG. 4b, the water 901 closest to the surface 901' comprises suspended particles 907. The water 901 closest to the bottom 909 of the storm water drain 903 comprises an even higher concentration of particles 907.

Figure 5C:
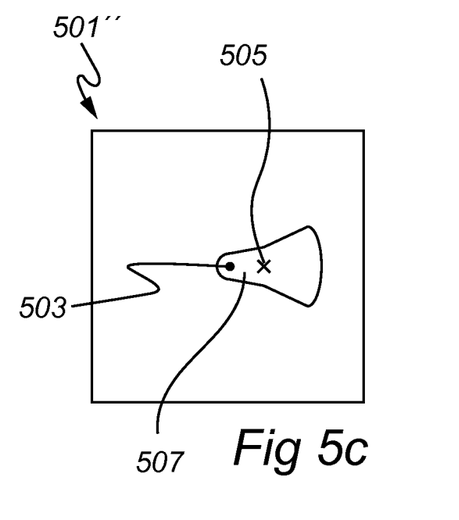

FIG. 5c shows a schematic view of the digital image representation 501" generated by the monitoring system 1 of FIG. 1 whilst performing the method described in relation to FIG. 4c. The digital image representation 501" comprises a point 503 corresponding to a position at which the focused light beam 109 intersects the surface 901' of the water 901. In FIG. 5c, this point 503 is located further towards the right-hand side than the same point 503 in FIG. 5b. This corresponds to the water level being lower in FIG. 4c than in FIG. 4b. Furthermore, left-most portion of the line 507 representing the path along which the focused light beam 109 is transmitted through the liquid 901 is wider than the left-most portion of the line 507 shown in FIG. 5b. This corresponds to the turbidity being higher at the surface 901' of the water 901 in the situation illustrated in FIG. 4c than in the situation illustrated in FIG. 4b.

Figure 4D:
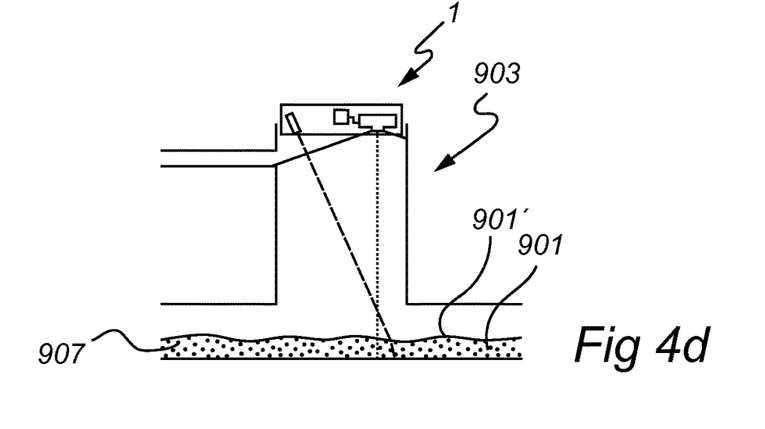
Figure 5D:
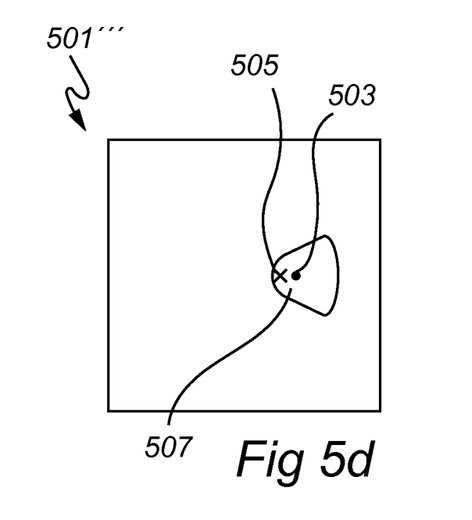

FIG. 4d shows the monitoring system 1 of FIG. 1, when in use for measuring the level and turbidity of water 901 in a storm water drain 903. The water level in the storm water drain 903 in FIG. 4d is at a level below that of FIG. 4c. Like the situation illustrated in FIG. 4c, the water 901 closest to the surface 901' comprises suspended particles 907.x FIG. 5d shows a schematic view of the digital image representation 510''' generated by the monitoring system 1 of FIG. 1 whilst performing the method described in relation to FIG. 4d. The digital image representation 501''' comprises a point 503 corresponding to a position at which the focused light beam 109 intersects the surface 901' of the water 109. In FIG. 5d, this point 503 is located further towards the right-hand side than the same point 503 in FIG. 5c. This corresponds to the water level being lower in FIG. 4d than in FIG. 4c. Furthermore, left-most portion of the line 507 representing the path along which the focused light beam 109 is transmitted through the liquid 901 is wider than the left-most portion of the line 507 shown in FIG. 5c. This corresponds to the turbidity being higher at the surface 901' of the water 901 in the situation illustrated in FIG. 4d than in the situation illustrated in FIG. 4c.

Generally, all terms used in the claims are to be interpreted according to their ordinary meaning in the technical field, unless explicitly defined otherwise herein. All references to "a/an/the [element, device, component, means, step, etc.]" are to be interpreted openly as referring to at least one instance of said element, device, component, means, step, etc., unless explicitly stated otherwise. Furthermore, any reference signs in the claims should not be construed as limiting the scope.

The invention claimed is:

1. A monitoring system for measuring and communicating properties of a liquid, wherein said monitoring system is configured to be arranged in a mounted position above and at a distance from a surface of the liquid, and wherein said monitoring system comprises:
   a light source configured to emit light towards the surface of said liquid along an optical axis, such that at least a portion of said light is transmitted through said liquid;
   a light detector configured to detect light that has been emitted from said light source and transmitted through said liquid and to generate an image representation of an intensity and spatial distribution of the emitted light that has been detected;
   the light detector and the light source are arranged at a distance from each other such that there is an angle between a peripheral portion of a field of view of the light detector and the optical axis of the light source; and
   a processing circuitry being configured to determine a turbidity of the liquid based on said image representation and wherein said image representation is analyzed by means of an image recognition algorithm.

2. The monitoring system according to claim 1, wherein said processing circuitry is configured to determine a level and the turbidity of the liquid based on said image representation.

3. The monitoring system according to claim 1, wherein said light detector and said light source are arranged such that an optical axis of said light detector is angled relative to an optical axis of said light source.

4. The monitoring system according to claim 3, wherein said angle between the optical axis of said light detector and the optical axis of said light source is greater than 2°.

5. The monitoring system according to claim 3, wherein said angle between the optical axis of said light detector and the optical axis of said light source is smaller than 14°.

6. The monitoring system according to claim 3, wherein said angle between the optical axis of said light detector and the optical axis of said light source is greater than 4°.

7. The monitoring system according to claim 3, wherein said angle between the optical axis of said light detector and the optical axis of said light source is greater than 6°.

8. The monitoring system according to claim 3, wherein said angle between the optical axis of said light detector and the optical axis of said light source is smaller than 12°.

9. The monitoring system according to claim 3, wherein said angle between the optical axis of said light detector and the optical axis of said light source is smaller than 10°.

10. The monitoring system according to claim 3, wherein said angle between the optical axis of said light detector and the optical axis of said light source is from 4° to 12°, and wherein said image representation comprises information related to at least one of (i) a rate of diffusion of the portion of said emitted light that is transmitted through said liquid, and (ii) a position where said emitted light intersects the surface of the liquid.

11. The monitoring system according to claim 1, wherein said image representation comprises information related to a rate of diffusion of the portion of said emitted light that is transmitted through said liquid.

12. The monitoring system according to claim 1, wherein said image representation comprises information about a position where said emitted light intersects the surface of the liquid.

13. The monitoring system according to claim 1, wherein said light source is configured to emit a focused light beam.

14. The monitoring system according to claim 1, wherein said light source is a laser.

15. The monitoring system according to claim 1, wherein said image representation is a 2-dimensional digital image representation.

16. The monitoring system according to claim 15, wherein said processing circuitry is configured to determine a level and the turbidity of the liquid by means of image recognition.

17. A method for determining properties of a liquid, the method comprising:
   emitting light, by means of a light source, from above a surface of the liquid towards the surface of the liquid;
   detecting, by means of a light detector, from above the surface of the liquid a portion of the light that has been emitted towards the surface of the liquid, after said portion of the light has intersected the surface of the liquid;
   arranging the light detector and the light source at a distance from each other such that there is an angle between a peripheral portion of a field of view of the light detector and an optical axis of the light source;
   generating an image representation of the intensity and spatial distribution of the emitted light that has been detected; and
   analyzing said image representation to determine the turbidity of the liquid by means of an image recognition algorithm.

18. The method according to claim 17, wherein light is emitted towards the surface of the liquid at an angle of incidence relative to the surface of the liquid, said method further comprising:
   providing a detector and arranging said detector above the surface of the liquid such that an optical axis of the detector is at an angle relative to the angle of incidence.

19. The method according to claim 18, further comprising:
   providing a light source and arranging said light source above the surface of the liquid.

20. The method according to claim 17, further comprising:
   providing a light source and arranging said light source above the surface of the liquid.

* * * * *